United States Patent

Hagiwara

Patent Number: 6,026,504
Date of Patent: Feb. 15, 2000

[54] MULTIPROCESSOR SYSTEM AND METHOD FOR ERROR TRACKING

[75] Inventor: Takashi Hagiwara, Tokyo, Japan

[73] Assignee: NEC Corporation, Tokyo, Japan

[21] Appl. No.: 08/916,205

[22] Filed: Aug. 22, 1997

[30] Foreign Application Priority Data

Aug. 28, 1996 [JP] Japan ................................ 8-245590

[51] Int. Cl.[7] ................................................ G06F 11/00
[52] U.S. Cl. ................................................................ 714/47
[58] Field of Search ............................ 395/184.01, 185.01, 395/185.05, 185.06, 185.02

[56] References Cited

U.S. PATENT DOCUMENTS

| | | | |
|---|---|---|---|
| 4,837,736 | 6/1989 | Donaldson et al. | 395/184.01 |
| 5,530,806 | 6/1996 | Condon et al. | 395/185.06 |
| 5,742,753 | 4/1998 | Nordsieck et al. | 395/184.01 |

*Primary Examiner*—Robert W. Beausoliel, Jr.
*Assistant Examiner*—Pierre E. Elisca
*Attorney, Agent, or Firm*—McGinn & Gibb, P.C.

[57] ABSTRACT

A multiprocessor system includes a plurality of nodes interconnected by a network. Each of the nodes includes a job identification number generator for generating a job identification number, a controller for issuing an instruction and associating the instruction with the job identification number, and a data transfer unit for transferring data according to the instruction. The data transfer unit includes an error detector for detecting an error and for generating an error signal. The error detector associates the error signal with the job identification number.

18 Claims, 5 Drawing Sheets

MULTIPROCESSOR SYSTEM AND METHOD FOR ERROR TRACKING

BACKGROUND OF THE INVENTION

1. Field of the Invention

The present invention relates to a multiprocessor system and method in which nodes, each of which includes a main memory, a data transfer unit and a plurality of processors, are connected through interconnecting networks, and more particularly to a method and apparatus for assigning job identification codes for determining the source of errors.

2. Description of the Related Art

Conventionally, there are synchronous and asynchronous operations between nodes in a multiprocessor system. In a synchronous operation, the processor which issued an instruction is prevented from switching to another task (e.g., a different user program) until the issued instruction is completed (e.g., completely processed).

In an asynchronous operation, the processor which issued the instruction is free to execute other instructions or to switch to a different processing, without waiting for completion of the issued instruction. The asynchronous operation is faster than the synchronous operation because the data transfer process between nodes generally takes several hundred to several thousand times a processor's main memory access time, during which the processor (e.g., in a synchronous operation) cannot execute other programs.

However, the synchronous operation is advantageous in that, when an error occurs, error notification is made to the processor which issued the data transfer instruction. Therefore, the user program which caused the error can be easily identified and terminated. Conversely, with the asynchronous operation, since the processor can (and does) switch to another task, if there is an error with a program, the source of the error is not detected easily.

The asynchronous operation is divided into two main types. A first type is a so-called "indirect type", and calls a system program which in turn calls a user program under the control of the system program. The second type of asynchronous operation is a so-called "direct-type", and the processor directly issues an asynchronous instruction from a user program without the intervention of the system program. The direct type is more desirable since the overhead associated with the indirect type is relatively large. Therefore, when higher-speed processing is desired, the direct type is more preferably.

Conventionally, error procedures for the direct-type asynchronous operations follow the process below.

First, the user program generates data transfer parameters such as a data transfer start address of the main memory within a given node, a data receive start address of the main memory within a destination node, a transfer data number and an end status area address of the main memory within a given node. The term "end status area address" as used herein refers to an address of the main memory which indicates normal or abnormal completion of the data transfer.

Next, the processor sends a start trigger to the data transfer unit. The start trigger is an asynchronous data transfer instruction issued from the user program. The processor sends the aforementioned data transfer parameters directly to the data transfer unit, or through the main memory to the data transfer unit.

The data transfer unit, upon receiving the data transfer instruction from the processor, performs data transfer according to the data transfer parameters received together with the instruction. When completing the data transfer, the data transfer unit writes whether the data transfer was completed normally, to the end status area of the main memory (e.g., the end status area address).

The processor executes subsequent instructions until it arrives at a data transfer end confirmation routine, which is part of the user program. Multiprogramming (e.g., time division processing) is performed during the confirmation routine, according to the system operating format, as is well known by those ordinarily skilled in the art. Thus, for brevity, such will not be described in detail herein.

When the confirmation routine is reached, the processor accesses the end status area of the main memory, and reads out the data transfer status therefrom. When the status indicates a normal termination, the processor performs the subsequent processing.

However, when there is an error, such as when the end status area does not show a normal termination, or when the end status area address is in a system area thereby not allowing its rewriting, the processor is unable to continue. Therefore, specifying with certainty which user program issued the error, is critical. However, since the processor may be executing a user program other than the user program which issued the error, specifying which user program issued the error may be impossible.

Therefore, with conventional systems performing the direct-type of asynchronous operations, the defective user program cannot be identified or terminated, which may cause the same error to occur repeatedly, thereby wasting processor time and decreasing overall system efficiency.

SUMMARY OF THE INVENTION

In view of the foregoing and other problems of the conventional systems and methods, it is an object of the present invention to provide a structure and method for specifying which user program causes an error in the direct-asynchronous-type processing systems.

In a first aspect, a multiprocessor system and method according to the present invention includes a plurality of nodes connected to a network. Each of the nodes includes a job identification generator for generating a job identification number, a unit for issuing an instruction issued during the processing of a job on it and associating the instruction with the job identification number, and a data transfer unit for transferring data according to the instruction. The data transfer unit includes a detector for detecting an error, and the error detector generates an error signal and associates the error signal with the job identification number.

With the invention, when a user program (e.g., a job) issues an asynchronous data transfer instruction to a given processor, the issuing unit (e.g., an instruction issuance controller) sends the asynchronous data transfer instruction issued by the user program, the job identification number held in the job identification number generator (e.g., a register) and the end status area address generated by the user program to the data transfer unit within the node to which the processor belongs.

It is noted that, for example, two types of errors are detect and pinpointed by the present invention. That is, the present invention can identify error in data transfer and error in the end status address field. For example, with regard to the data transfer, a normal end or an abnormal end may occur. An abnormal end is stored as an end status error in the end status area address.

For each of these situations (e.g., normal end and abnormal end), the error in the address area is considered. Thus, when there is a normal termination of data transfer, it is determined whether there is error or no-error in the address area, and similarly when there is an abnormal termination of data transfer, it is determined whether there is error or no-error. The status of error or no-error will be reported to the processor from an exception processing unit discussed in greater detail below.

Each data transfer unit includes a data transfer controller. The data transfer controller within the data transfer unit starts its data transfer according to the received asynchronous data transfer instruction, and determines whether there is an error in the end status area address at the end of the data transfer. When there is no error, the data transfer controller writes a normal (and abnormal, as the case may be) termination status, in the end status area of the main memory indicated by the end status area address. When there is an error, an abnormal termination status is written in the end status area of the main memory indicated by the end status area address. Further, when there is an error, the data transfer unit outputs the received job identification number together with the asynchronous data transfer instruction.

Each data transfer unit also includes an exception processing unit. The exception processing unit sends an exception report, containing the job identification number issued from the data transfer controller, to an exception report destination processor indicated by content of an exception report destination processor number register, when the data transfer controller issues the job identification number. Thus, the processor specifies, with certainty, which job issued the erroneous end status area address.

To prevent a specific processor from being set as the only exception report destination processor (which could overload a single processor), each data transfer unit includes a processor number change circuit for changing the processor number held in the exception report destination processor number register at regular intervals.

To terminate the job which issued the erroneous end status area address, each processor includes an interrupt controller for performing a termination process based on the job identification number contained in the exception report received from the data transfer unit. Therefore, the interrupt controller within the exception report destination processor performs the termination process based on the job identification number contained in the exception report received from the data transfer unit.

Therefore, with the unique and unobvious structure and method of the present invention, when there is an error, such as when the end status area does not show a normal termination, or when the end status area address is in a system area thereby not allowing its rewriting, and the processor is unable to continue, the user program which issued the error is identified with certainty. Hence, the defective user program can be identified and terminated, thereby preventing the same error from occurring repeatedly, and thereby maintaining overall system efficiency. It is noted that the above-described problem will not arise in the indirect-type asynchronous operation since the operating system is theoretically foolproof, and user error will not be introduced therein.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
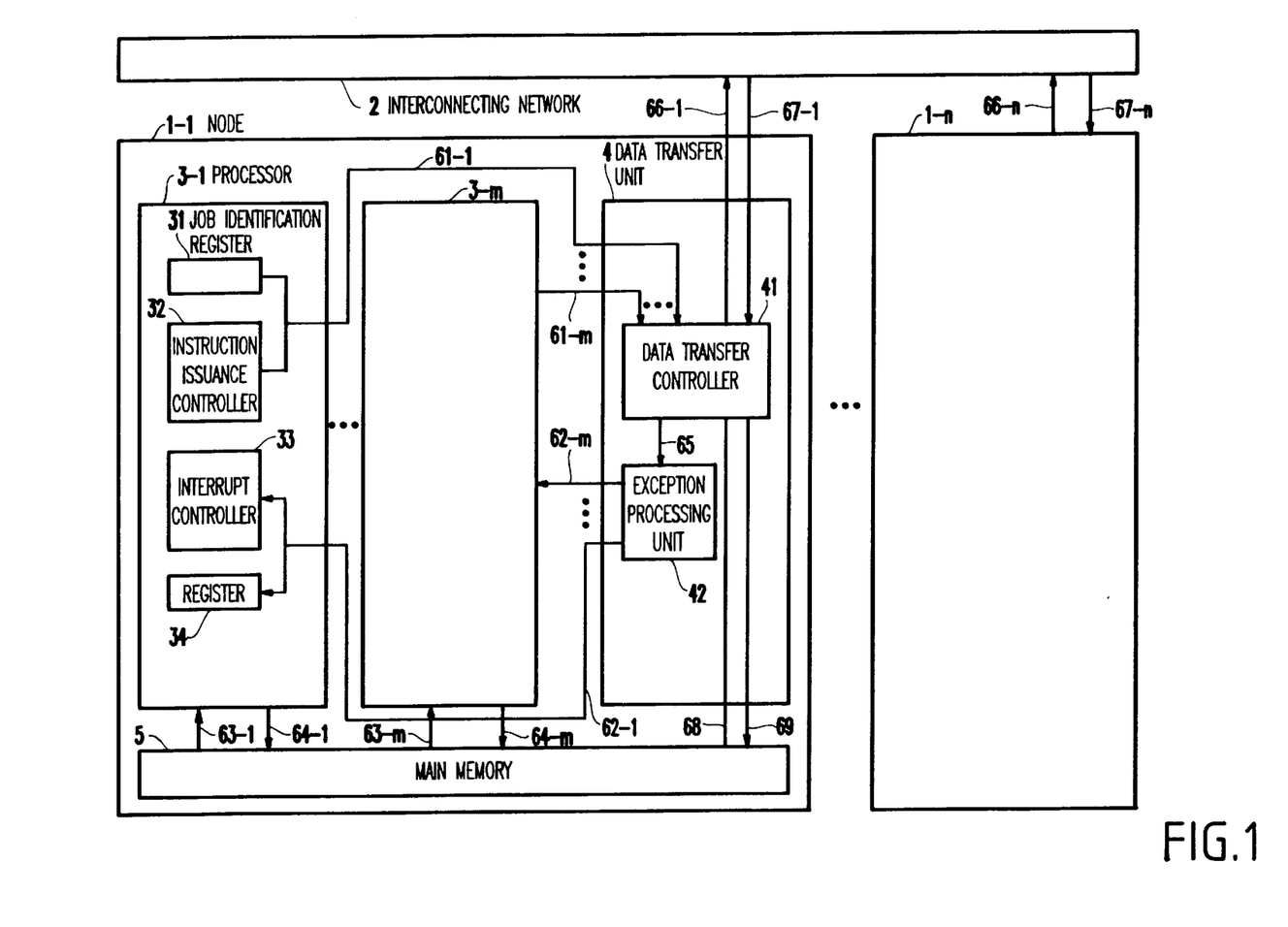
FIG. 1 is a schematic block diagram of a multi-processor system according to the present invention.

Referring now to the drawings, and more particularly to FIG. 1, a preferred embodiment of the present invention is shown, in which a multiprocessor system includes nodes 1-1 to 1-n interconnected by an interconnecting network 2, wherein n is an integer. The n nodes 1-1 to 1-n, each respectively including processors 3-1 to 3-m (where m is an integer less than n), a data transfer unit 4, and a main memory 5, are connected to the interconnecting network 2 through signal lines 66-1 to 66-n and 67-1 to 67n.

The m processors 3-1 to 3-m each include a job identification number register 31, an instruction issuance controller 32, an interrupt controller 33, and an in-processor exception job identification number register 34.

The job identification number register 31 preferably is a register for holding therein the job identification number (a unique identification number in the system) of a job (e.g., a user program or portion of a user program) being executed within a given processor. The number can be rewritten only by a system program. The job identification number may be designed to have any number of bits, but of course can be modified suitably to have any number of bits depending upon design constraints.

The instruction issuance controller 32 outputs an asynchronous data transfer instruction issued from the user program, data transfer parameters generated by the user program and a job identification number held in the job identification number register 31, to the data transfer unit 4. The data transfer parameters include a data transfer start address of the main memory within a given node, a data receive start address, a data transfer number, an end status area address, etc. of a main memory within a given destination node.

The interrupt controller 33, when receiving an exception report (e.g., an error report) from the data transfer unit 4, calls upon the system program to perform an exception process (e.g., a termination process). The in-processor exception job identification number register 34 preferably is a register for holding a job identification number contained in the exception report received from the data transfer unit 4.

The data transfer unit 4 has a data transfer controller 41 and an exception processing unit 42. The data transfer controller 41 is connected through the signal lines 66-1 and 67-1 to the interconnecting network 2, through signal lines 68 and 69 to the main memory 5, and through signal lines 61-1 to 61-m and 62-1 to 62-m to the processors 3-1 to 3-m, respectively.

The data transfer controller 41 controls data transfer with another node according to the data transfer parameters when it receives an asynchronous data transfer instruction. The data transfer controller 41 judges whether there is an error in the end status area address. Specifically, control 41 checks a packet for error in the end status area address. When there is no error in the end status area address, the data transfer controller 41 writes whether the data transfer is normally or abnormally terminated. It is noted that abnormal termination can occur even when no error is indicated, since the data transfer may be terminated abnormally for other reasons.

Once again, as noted above the present invention can detect and pinpoint, for example, two types of errors (e.g., the present invention can identify error in data transfer and error in the end status address field). With regard to the data transfer, a normal end or an abnormal end may occur. An abnormal end is stored as an end status error in the end status area address.

For each of a normal end and an abnormal end, the error in the address area is considered. Hence, when there is a normal termination of data transfer, it is determined whether there is error or no-error in the address area. Similarly when there is an abnormal termination of data transfer, it is determined whether there is error or no-error. The status of error or no-error will be reported to a processor from exception processing unit 42 through line 62-1 (62-m).

When there is an error, the data transfer controller 41 outputs the job identification number together with the data transfer instruction to the exception processing unit 42 as the identification number of a job having an error in the address of the end status area address. It is noted that besides data transfer errors, the present invention also can detect errors by normal user (programrnmer) inputted error. An important feature of the present invention is that any error detected by the data transfer unit can be alerted to the exception processing unit 42. Hence, a key feature of the invention is that exception processing unit 42 associates an error with a job (parameter), and then reports the error to any processor of a multi-processor system.

In another aspect, if an abnormal termination occurs, then a report can be made to the exception processing unit 42 and then the exception processing unit 42 reports back to any processor to begin an exception processing subroutine.

The exception processing unit 42 sends the exception report, containing the job identification number issued from the data transfer controller 41, to a processor (any one of the processors 3-1 to 3-m) as its exception report destination when the job identification number of the defective job is issued from the data transfer controller 41.

It is noted that the specific structures of the individual elements 2, 3-n, 4, and 5 described above are believed to be well-known and well within the grasp of one of ordinary skill in the art within the purview of the present invention, and thus for brevity will not be described herein in detail.

Figure 2:
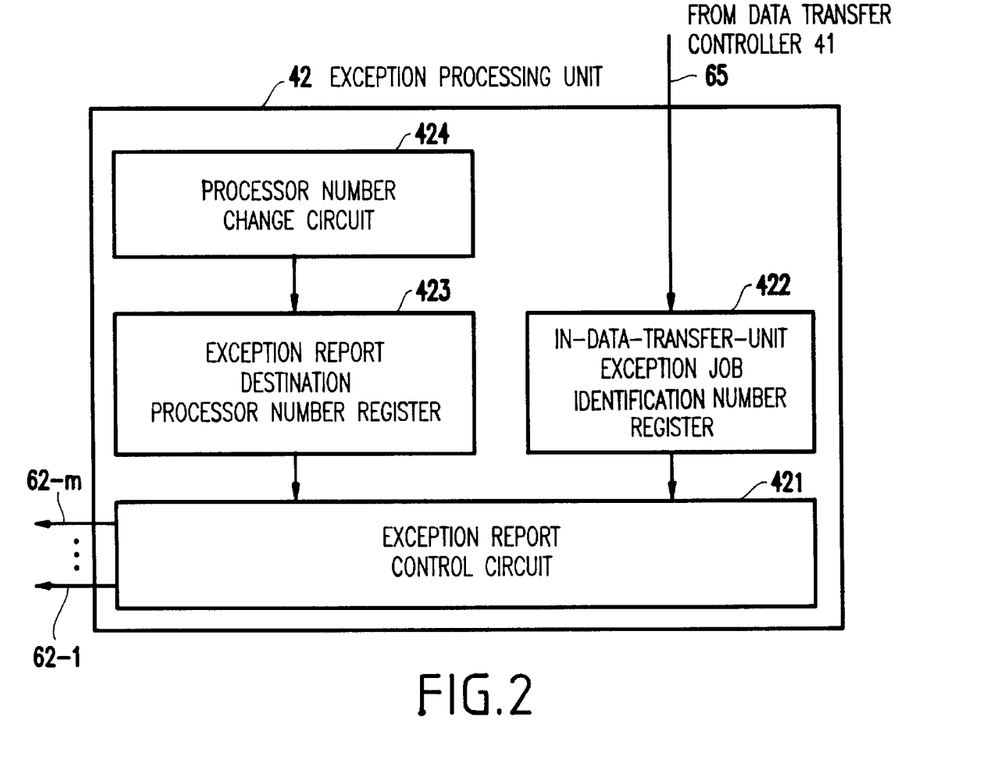
FIG. 2 is a schematic block diagram of an exception processing unit according to the present invention.

FIG. 2 illustrates the operation and structure of the exception processing unit 42, which includes an exception report control circuit 421, an in-data-transfer-unit exception job identification register 422, an exception report destination processor number register 423, and a processor number change circuit 424.

The in-data-transfer-unit exception job identification register 422 is a register for holding the job identification number of the defective job received through the signal line 65 from the data transfer controller 41. The exception report destination processor number register 423 is a register for holding a processor number as the exception report destination. Register 423 is for load balancing and holds a number (e.g., "1", "2", etc.) therein similar to a counter. Registers 422 and 423 each preferably are formed by a standard flip-flop or the like.

The processor number change circuit 424 changes the processor number held in the exception report destination processor number register 423 at regular intervals, such as every 1 second (or any other time deemed to be feasible by the designer given system constraints and requirements). The purpose for such a change is for load balancing of the system, thereby increasing overall system efficiency.

Various methods can be used to change the processor number at regular intervals by those skilled in the art taking the present specification as a whole. For example, the first processor of the processors 3-1 to 3-m within a given node can be set as an initial value, and thereafter, the next processor can be set in the exception report destination processor number register 423 and so forth. When the largest processor number is set in the exception report destination processor number register 423, the initial processor number can be reset therein.

The exception report control circuit 421 sends the job identification number of the defective job held in the in-data-transfer-unit exception job identification number register 422 to one of the processors 3-1 to 3-mn (e.g., the processor receiving the job identification number is the processor identified by the exception report destination) within the node having the processor number held in the exception report destination processor number register 423, thereby to identify with certainty the defective job.

Hence, when there is an error, such as when the end status area does not show a normal termination, or when the end status area address is in a system area thereby not allowing its rewriting, and the processor is unable to continue, the user program which issued the error is identified precisely. As a result, the defective user program can be identified and terminated, thereby preventing the same error from occurring repeatedly, and thereby maintaining overall system efficiency.

OPERATION OF THE PRESENT INVENTION

Figure 4:
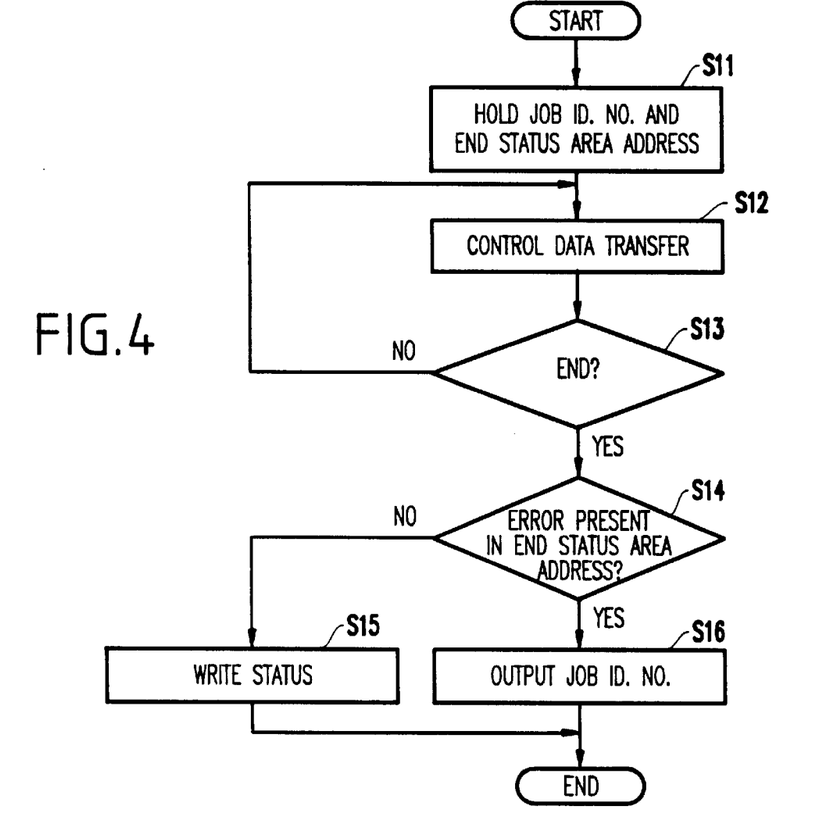
FIG. 4 is a flowchart of a processing operation of a data transfer controller according to the present invention.
Figure 5:
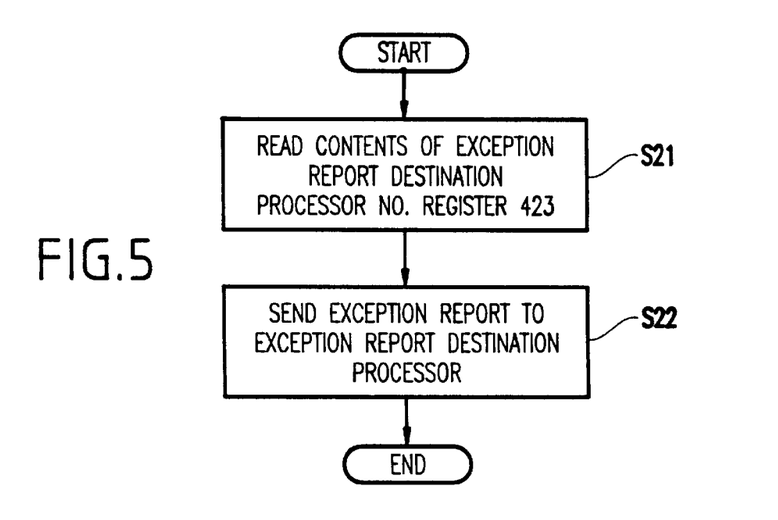
FIG. 5 is a flowchart of a processing operation of an exception processing unit according to the present invention.

Hereinbelow, the operation of the structure shown in FIGS. 1 and 2 will be explained with reference to FIGS. 3–5. Specifically, FIG. 3 illustrates the processing operation of the instruction issuance controller 32 of the processor 3-1, FIG. 4 illustrates the operation of the data transfer controller 41 of the data transfer unit 4, and FIG. 5 illustrates the operation of the exception processing unit 42 shown in FIG. 2.

The user program being executed on a given processor (e.g., 3-1) generates such data transfer parameters as the data transfer start address of the main memory 5 in its own node 1-1, the data receive start address of a main memory in the destination node, a transfer data number, or an end status area address when the user program must issue an asynchronous data transfer instruction. Thereafter, the user program issues the asynchronous data transfer instruction.

Figure 3:
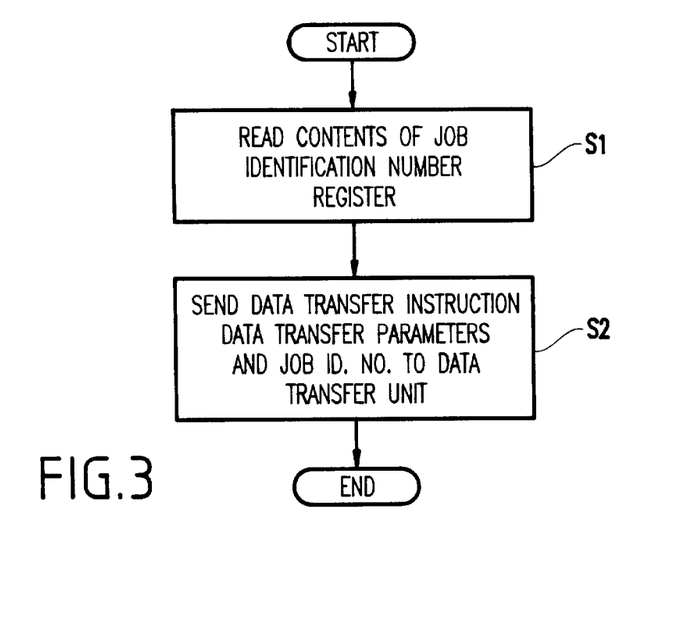
FIG. 3 is a flowchart of a processing operation of an instruction issuance controller according to the present invention.

Turning now to the flowchart of FIG. 3, when the user program issues the asynchronous data transfer instruction, first the instruction issuance controller 32, reads the contents (e.g., the job identification number) held in the job identification number register 31 (step S1). The job identification number held in the job identification number register 31 is the job identification number of the user program now (currently) being executed by the current processor 3-1, and is set as a unique number by the system program.

Thereafter, in step S2, the instruction issuance controller 32 sends to the data transfer unit 4 the asynchronous data transfer instruction issued by the user program, the data transfer parameters generated by the user program, and the job identification number (at step S1), through the signal line 61-1. The processing operation of the instruction issuance controller 32 of the processor 3-1 is completed at this point.

Thereafter, the operation of the data transfer controller 41 of the data transfer unit 4 is performed. Specifically, as shown by the flowchart of FIG. 4, the data transfer controller 41 saves (holds) the job identification number received from the processor 3-1 and the end status area address contained in the data transfer parameters. Then, the data transfer controller 41 controls the data transfer according to the data transfer parameters (S11 and S12).

In step S13, it is determined whether the data transfer is completed. When the data transfer is completed (e.g., a "YES" in the step S13), in step S14 the data transfer controller 41 judges whether there is an error in the end status area address held by the data transfer controller 41 (as performed in step S11).

In step S14, when it is determined that there is no error, the data transfer controller 41 writes a status (e.g., through line 69), indicating normal (or abnormal) completion of the data transfer, in the end status area of the main memory 5 shown by the end status area address (S15).

Conversely, in step S14, when it is determined that there is an error, the data transfer controller 41 outputs the job identification number (as held in step S11) as the job identification number of the job which caused the error (S16). The job identification number issued from the data transfer controller 41 is sent through the signal line 65 to the in-data-transfer-unit exception job identification register 422 within the exception processing unit 42. This completes the operation of the data transfer controller 41 of the data transfer unit 4, as shown in the flowchart of FIG. 4.

Turning now to FIG. 5, which illustrates the operation of the exception processing unit 42 shown in FIG. 2, in step S21 the exception report control circuit 421 reads the processor number set in the exception report destination processor number register 423.

Thereafter, in step S22 the exception report control circuit 421 sends an exception report containing the job identification number and information indicative of the presence of an error to the exception report destination processor (e.g., processor 3-1). The exception report is accepted by the interrupt controller 33 of the processor 3-1. The job identification number contained in the exception report is stored in the in-processor exception job identification number register 34. When accepting the exception report, the interrupt controller 33 notifies the system program of the presence of an error.

Then, the system program performs an exception processing to abort the job of the job identification number set in the in-processor exception job identification number register 34 within the processor 3-1.

The processor number change circuit 424 preferably changes the contents of the exception report destination processor number register 423 at regular intervals in the foregoing embodiment, as mentioned above. Alternatively, the contents of the exception report destination processor number register 423 may be fixed. However, it is preferable to change the contents of the exception report destination processor number register 423 at regular intervals, so as to not overload a given processor. Such changing allows load balancing of the system, thereby contributing to greater overall system efficiency.

As described above, according to the unique and unobvious structure and method of the present invention, when the user program issues an asynchronous data transfer instruction to the instruction issuance controller, the job identification number of the job being executed and the end status area address generated by the user program are sent to the job identification number register of the data transfer unit 4. When there is an error in the received end status area address, the exception processing unit 42 outputs the job identification number of the job received together with the data transfer instruction, to the processor (e.g., 3-1). Therefore, the system can specify which job (e.g., which user program) was involved with the error, and terminate the same. Hence, system efficiency is increased.

Additionally, a processor number change circuit 424 changes the processor number held in the exception report destination processor number register 423. Therefore, a plurality of processors can be used selectively as the exception report destination processor, thereby preventing any individual processor from being overloaded.

Furthermore, the interrupt controller 33 performs exception processing (e.g., defective user program termination) based on the job identification number contained in the exception report. Therefore, the user program which caused the error can be terminated immediately by the interrupt controller 33.

Figure 6:
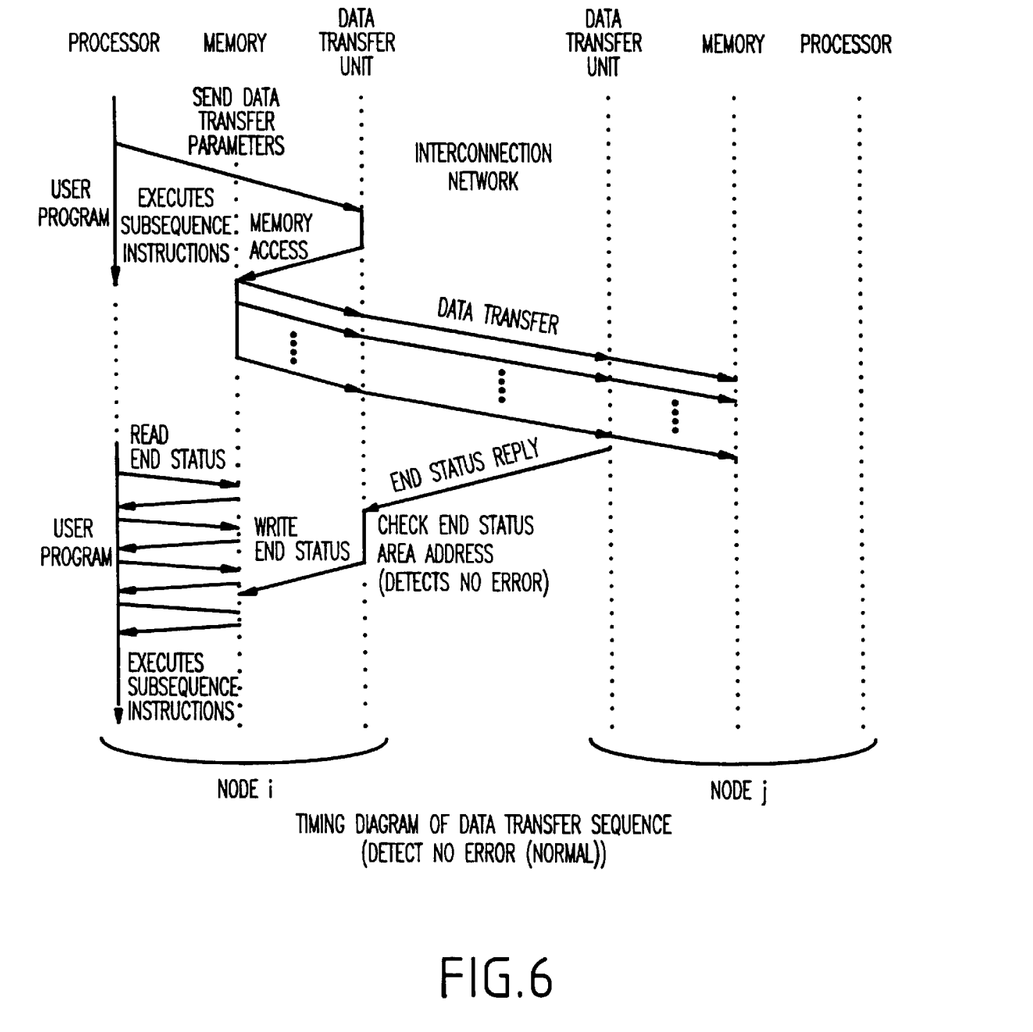
FIG. 6 illustrates a timing diagram of the present invention when there is no error in the end status area address field.
Figure 7:
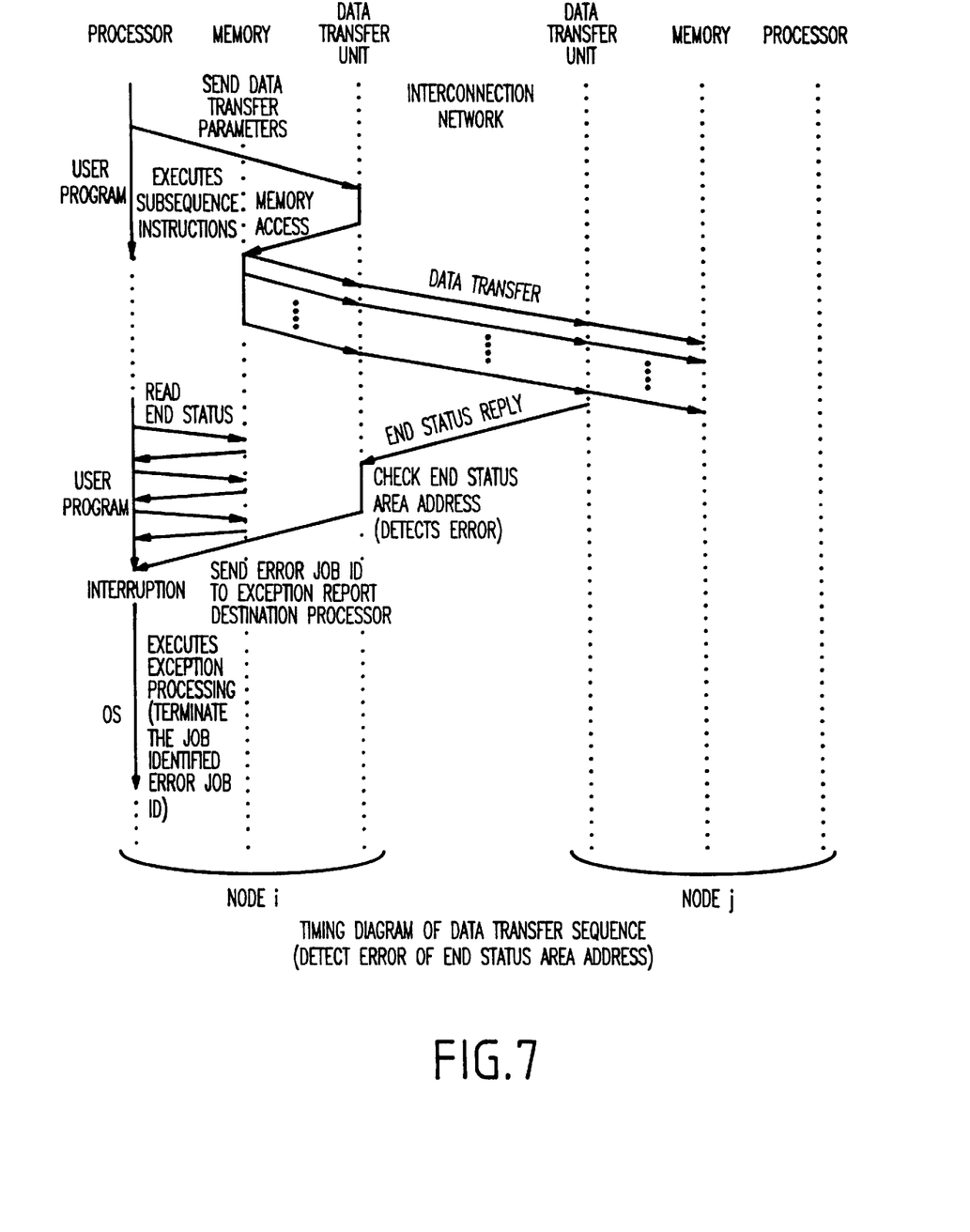
FIG. 7 illustrates a timing diagram of the present invention when there is an error in the end status area address field.

FIG. 6 illustrates a timing diagram when there is no error in the end status area address field, whereas FIG. 7 illustrates a timing diagram when there is an error in the end status area address field.

Specifically, in FIG. 6 in which no error is detected, the user program of a processor (e.g. ,3-i) of a first node i executes subsequence instructions, and data transfer parameters are sent to data transfer unit 4. Data transfer unit 4 requests a memory access to the main memory 5, and thereafter data transfer is performed to a main memory (e.g., main memory 5) of another node j through the interconnection network and the node j's data transfer unit 4.

At the completion of the data transfer, an end status reply is sent by the data transfer unit 4 of node j to the data transfer unit 4 of node I. The data transfer unit 4 of node i checks the end status area address and detects no errors. Accordingly, the end status is written to the main memory 5 of node i.

In the timing diagram of FIG. 7, error is detected. Specifically, the user program of a processor (e.g.,3-i) of a first node i executes subsequence instructions, and data transfer parameters are sent to data transfer unit 4. Data transfer unit 4 requests a memory access to the main memory 5, and thereafter data transfer is performed to a main memory (e.g., 5) of another node j through the interconnection network and the node j's data transfer unit 4.

At the completion of the data transfer, an end status reply is sent by the data transfer unit 4 of node j to the data transfer unit 4 of node i. The data transfer unit 4 of node i checks the end status area address and detects an error.

Accordingly, the data transfer unit 4 of node i sends an error job identification to an exception report destination processor and interrupts the user program currently reading the end status. The end status is not written to the main memory 5 of node i. Thus, the user program is interrupted by the processor and the operating system executes an exception processing (e.g., terminates the job identified by the error job identification).

Hence, with the structure and method of the present invention, when there is an error, such as when the end status area does not show a normal termination, or when the end status area address is in a system area thereby not allowing its rewriting, and the processor is unable to continue, the defective user program which issued the error is identified with certainty and terminated, thereby preventing the same error from occurring repeatedly, and thereby maintaining overall system efficiency.

While the invention has been described in terms of a single preferred embodiment, those skilled in the art will recognize that the invention can be practiced with modification within the spirit and scope of the appended claims.

For example, while it is noted that the invention is primarily detected to error caused by the user (e.g., direct-type) and error resulting in the "end status area address" of the main memory, it is possible to detect error in other parameters and then to report back such error to any processor for exception processing in a party node.

Further, the invention is applicable to other errors which should be reported for exception processing to any processor and which contributes to load balancing.

Having thus described my invention, what I claim as new and desire to secure by Letters Patent is as follows:

1. A multiprocessor system, comprising:
   a plurality of interconnected nodes, each of said nodes comprising:
      a data transfer unit for transferring data according to an asynchronous data transfer instruction issued during the processing of a job, said data transfer unit including an error detector for detecting an error involved in transfer of said data,
      said error detector for generating an error detection signal in response to the detection of said error and for associating said error detection signal with a job identification number which identifies said job from a plurality of jobs a synchronously executed on said nodes.

2. The system according to claim 1, wherein each of said nodes further comprises:
   a controller for issuing an instruction, and associating said instruction with said job identification number.

3. The system according to claim 2, wherein each of said nodes further comprises:
   a network for interconnecting said plurality of nodes.

4. The system according to claim 2, wherein each of said nodes further comprises:
   a plurality of processors, each of said processors including therein said controller, said controller comprising an instruction issuance controller; and
   at least one main memory connected to said processors.

5. The system according to claim 4, wherein a first processor of said processors issues said instruction, and said error detector issues said error signal and said job identification number to a second processor of said processors.

6. The system according to claim 4, wherein each of said processors further comprises:
   a register for storing said job identification number associated with said error signal; and
   an interrupt controller for terminating a job associated with said job identification number.

7. The system according to claim 2, wherein said data transfer unit comprises a data transfer controller connected to said controller and an exception processing unit connected to said data transfer controller.

8. The system according to claim 2, further comprising:
   means, connected to said error detector, for terminating a job associated with said error signal.

9. The system according to claim 6, wherein said terminating means comprises an interrupt controller and a register for storing said job identification number associated with said error signal.

10. The system according to claim 1, wherein said error is reportable to any processor of said multiprocessor system.

11. A multiprocessor system, comprising:
    a plurality of interconnected nodes, each of said nodes comprising:
       a data transfer unit for transferring data according to an instruction issued during the processing of a job, said data transfer unit including an error detector for detecting an error involved in transfer of said data,
       said error detector for generating an error detection signal in response to the detection of said error and for associating said error detection signal with a job identification number which identifies said job, wherein each of said nodes further comprises a plurality of processors, and
       said error detector includes a processor change circuit for selecting one of said processors at regular intervals to which said error detector reports said error detection signal along with said job identification number.

12. A multiprocessor system comprising:
    a node including a main memory, a data transfer unit for performing data transfer and a plurality of processors being interconnected, each of said processors comprising:
       an instruction issuance controller for outputting to said data transfer unit an asynchronous data transfer instruction issued by a job, address information specifying an end status area address in said main memory at which the status of said data transfer by said data transfer unit is to be stored and which is generated by said job, and a job identification number which identifies said job,
    said data transfer unit for performing said data transfer according to said instruction, and said data transfer unit including an error detector for detecting an error in said address information,
    said error detector for generating an error detection signal in response to the detection of said error and for associating said error detection signal with said job identification number.

13. The system according to claim 12, wherein said data transfer unit writes a status indicative of normal termination or abnormal termination of said data transfer in said end status area when judging that there is no error, and
    wherein said data transfer unit outputs a received job identification number together with said asynchronous data transfer instruction when there is an error.

14. The system according to claim 13, wherein said data transfer unit further comprises:
    an exception processing unit for sending an exception report containing said job identification number to said exception report destination processor indicated by contents of said exception report destination processor number register when said data transfer controller outputs said received job identification number.

15. The system according to claim 14, wherein said data transfer unit further comprises:
    a processor number change circuit for changing said processor number held in said exception report destination processor number register to a processor number of another processor within a node to which said data transfer unit belongs, at a predetermined interval.

16. The system according to claim 15, wherein said processor includes an interrupt controller for performing exception processing based on said job identification number contained in said exception report.

17. A method for identifying an error in asynchronous data processing, said method comprising:

associating a job identification number which identifies a job, with an instruction;

issuing said instruction and said job identification number to a data transfer unit;

executing, by said data transfer unit, said instruction to perform data transfer;

determining whether an error occurred during said executing and producing an error detection signal upon detection of said error; and associating said job identification number with said error detection signal.

18. The method according to claim 17, wherein said error to be detected in said determining is an error in address information, and the status of said data transfer is stored at said end status area address in a main memory specified by said address information which is issued together with said instruction in said issuing, if said error is not detected in said determining.

* * * * *